United States Patent
Ohshitanai

(10) Patent No.: US 12,081,885 B2
(45) Date of Patent: Sep. 3, 2024

(54) IMAGE SENSOR AND CONTROL METHOD OF IMAGE SENSOR, AND IMAGE CAPTURING APPARATUS

(71) Applicant: CANON KABUSHIKI KAISHA, Tokyo (JP)

(72) Inventor: Kazuki Ohshitanai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 946 days.

(21) Appl. No.: 16/842,217

(22) Filed: Apr. 7, 2020

(65) Prior Publication Data
US 2020/0335545 A1  Oct. 22, 2020

(30) Foreign Application Priority Data
Apr. 18, 2019 (JP) .................. 2019-079562

(51) Int. Cl.
 *H04N 25/709* (2023.01)
 *H04N 25/773* (2023.01)
 *H04N 25/779* (2023.01)

(52) U.S. Cl.
 CPC ......... *H04N 25/709* (2023.01); *H04N 25/773* (2023.01); *H04N 25/779* (2023.01)

(58) Field of Classification Search
 CPC ...... H04N 25/709; H04N 25/74; H04N 25/76; H04N 25/773; H04N 25/779
 See application file for complete search history.

(56) References Cited

U.S. PATENT DOCUMENTS

| 2017/0179173 A1* | 6/2017 | Mandai ............ H01L 27/14609 |
| 2020/0045257 A1* | 2/2020 | Iwahara ................ H04N 25/13 |
| 2020/0045258 A1 | 2/2020 | Ishii et al. |
| 2020/0249143 A1* | 8/2020 | Takeuchi ........... G01N 15/1459 |

FOREIGN PATENT DOCUMENTS

| JP | 2010-520447 A | 6/2010 |
| JP | 2015177148 A | 10/2015 |
| JP | 2018-198388 A | 12/2018 |
| WO | 2008/104799 A1 | 9/2008 |

OTHER PUBLICATIONS

Notice of Reasons for Refusal issued by the Japan Patent Office on Mar. 20, 2023 in corresponding JP Patent Application No. 2019-079562, with English translation.

* cited by examiner

*Primary Examiner* — Daniel M Pasiewicz
(74) *Attorney, Agent, or Firm* — Carter, DeLuca & Farrell LLP

(57) ABSTRACT

An image sensor comprises: a plurality of pixels each having an avalanche photodiode; and a control unit that controls to provide to the avalanche photodiodes of the plurality of pixels a reverse bias voltage that periodically changes.

12 Claims, 6 Drawing Sheets

IMAGE SENSOR AND CONTROL METHOD OF IMAGE SENSOR, AND IMAGE CAPTURING APPARATUS

BACKGROUND OF THE INVENTION

Field of the Invention

The present invention relates to an image sensor which uses an avalanche photodiode, a control method of an image sensor, and an image capturing apparatus.

Description of the Related Art

Conventionally, there is a light receiving element that operates an avalanche photodiode (APD) in a Geiger mode to detect a single photon. In such an APD, when a single photon is incident while a reverse bias voltage larger than a breakdown voltage is applied, carriers generated by the incident photon cause avalanche multiplication and large current is generated. Based on this current, it is possible to detect that a single photon is incident on the APD. Such an APD is called a SPAD (Single Photon Avalanche Diode).

In an image sensor using a SPAD in a pixel, large current is generated each time a photon is incident as described above. A problem that when photons continue to be incident on an image sensor, in particular, having a large number of pixels, such current is repeatedly generated in many pixels, and power consumption greatly increases is known.

Japanese Patent Laid-Open No. 2015-177148 discloses that a reverse bias voltage smaller than a breakdown voltage is applied to a SPAD during a period of not detecting photons. By controlling the reverse bias voltage in this manner, it is possible to suppress power consumption.

However, according to Japanese Patent Laid-Open No. 2015-177148, power consumption cannot be suppressed during a period of detecting photons.

In general, when a SPAD is used in a pixel, a reverse bias voltage larger than breakdown voltages of all SPADs used in a plurality of pixels is applied in a state for detecting photons. Since the breakdown voltage varies for each SPAD, a reverse bias voltage larger than the largest breakdown voltage among the breakdown voltages of all the SPADs is applied. Therefore, in a SPAD having a small breakdown voltage, an unnecessarily large reverse bias voltage is applied, so that the current generated when a photon is incident on such SPAD is larger than current generated by a SPAD having a large breakdown voltage, and more power is consumed.

SUMMARY OF THE INVENTION

The present invention has been made in consideration of the above situation, and suppresses average power consumption in a case where breakdown voltages of a plurality of avalanche photodiodes vary.

According to the present invention, provided is an image sensor comprising: a plurality of pixels each having an avalanche photodiode; and a control unit that controls to provide to the avalanche photodiodes of the plurality of pixels a reverse bias voltage that periodically changes, wherein the control unit is implemented by one or more processors, circuitry or a combination thereof.

Further, according to the present invention, provided is an image capturing apparatus comprising: an image sensor having a plurality of pixels each having an avalanche photodiode, and a control unit that controls to provide to the avalanche photodiodes of the plurality of pixels a reverse bias voltage that periodically changes; and a signal processing unit that processes a signal output from the image sensor, wherein each unit is implemented by one or more processors, circuitry or a combination thereof.

Furthermore, according to the present invention, provided is a control method of an image sensor having a plurality of pixels each having an avalanche photodiode, comprising controlling to provide to the avalanche photodiodes of the plurality of pixels a reverse bias voltage that periodically changes.

Further, according to the present invention, provided is a non-transitory computer-readable storage medium, the storage medium storing a program that is executable by the computer, wherein the program includes program code for causing the computer to perform a control method of an image sensor having a plurality of pixels each having an avalanche photodiode, comprising controlling to provide to the avalanche photodiodes of the plurality of pixels a reverse bias voltage that periodically changes.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Figure 1:
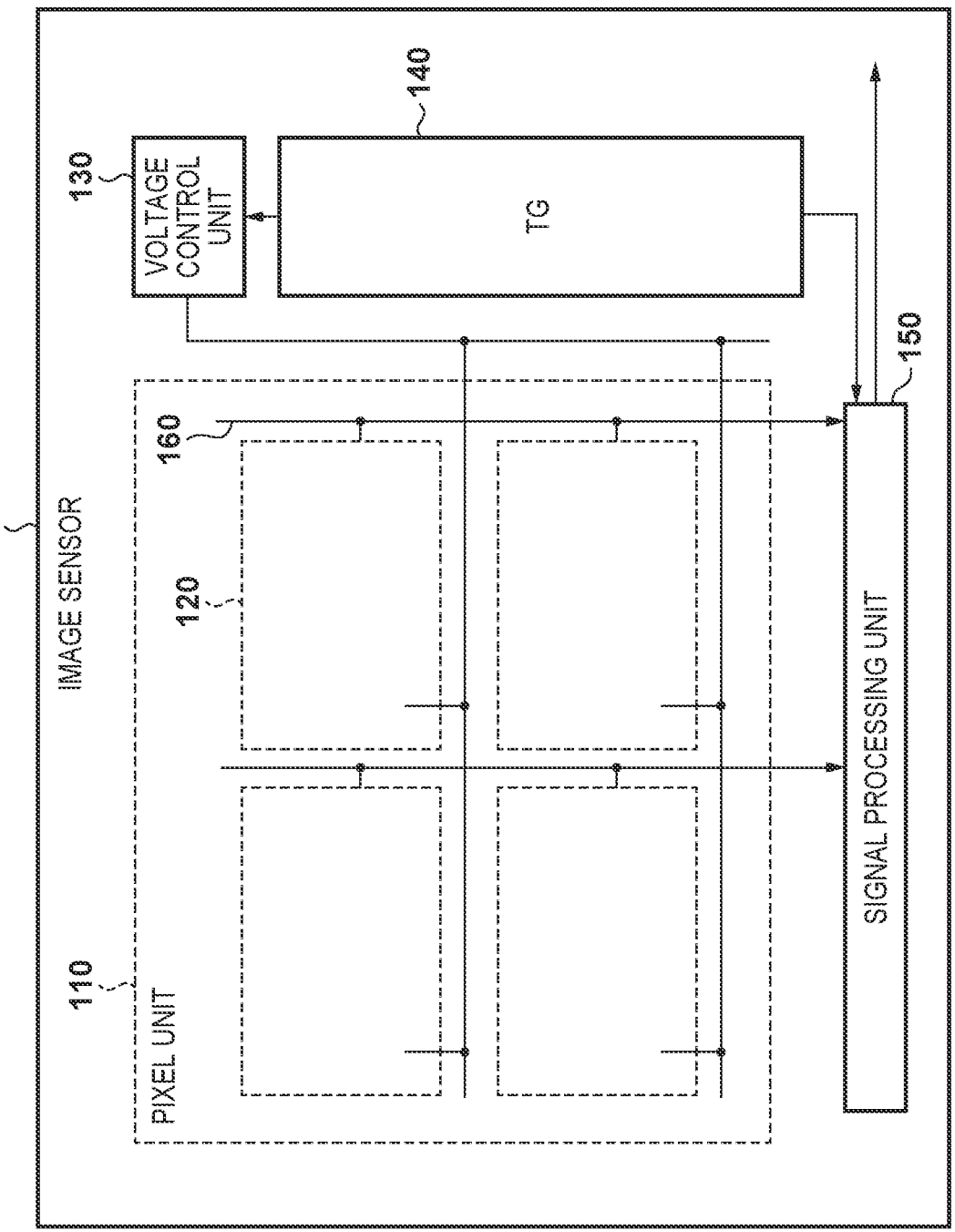
FIG. 1 is a block diagram illustrating a configuration of an image sensor according to a first embodiment of the present invention.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

Note, in the following description, the magnitudes of the voltage and the current are represented by absolute values.

First Embodiment

Hereinafter, a configuration of an image sensor 100 according to the first embodiment and a control method thereof will be described with reference to FIG. 1.

In FIG. 1, the image sensor 100 includes a pixel unit 110, pixels 120, a voltage control unit 130, a timing control unit (hereinafter, referred to as "TG") 140, and a signal processing unit 150.

In the pixel unit 110, a plurality of pixels 120 are arranged, and data transfer lines 160 are provided for respective columns. Each pixel 120 includes a SPAD (Single Photon Avalanche Diode) and counts photons incident on the SPAD. The count value, which is the counted data, is transferred to the signal processing unit 150 via the data transfer line 160. Although four pixels 120 are shown in FIG. 1 for the sake of explanation, a very large number of pixels 120 are actually arranged in a matrix to form the pixel unit 110.

The voltage control unit 130 controls the reverse bias voltage Vbias applied to the SPAD of each pixel 120 based on the timing signal from the TG 140. The first embodiment is characterized in that the voltage control unit 130 periodically changes the reverse bias voltage Vbias when in a state in which the image sensor 100 is capable of detecting photons. The control of the reverse bias voltage Vbias will be described later in detail.

The TG 140 controls the pixels 120, the voltage control unit 130, and the signal processing unit 150. The signal processing unit 150 is controlled by the TG 140 and holds the count value of each pixel 120 read via the data transfer line 160. Further, the signal processing unit 150 performs digital processing such as gain processing and signal rearrangement on the held count values from the pixels 120, and outputs a processed signal to the outside of the image sensor 100.

Figure 2:
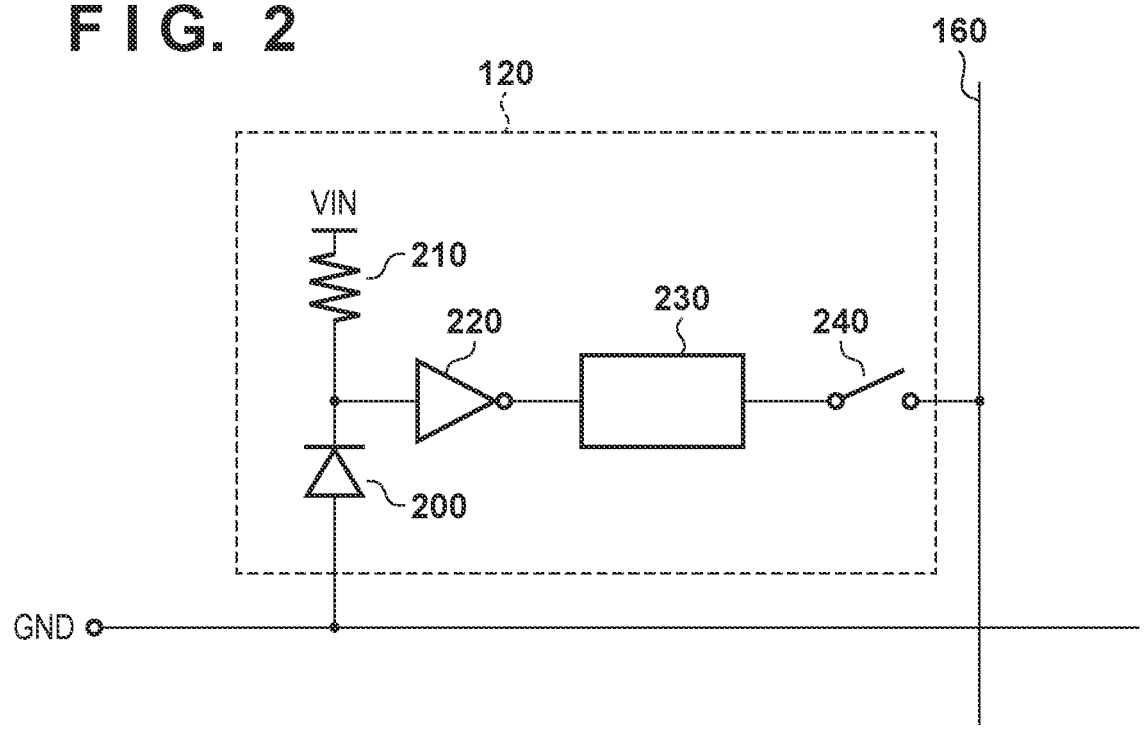
FIG. 2 is a circuit diagram illustrating a schematic configuration of a pixel according to the first embodiment.

FIG. 2 is a circuit diagram illustrating a schematic configuration of a pixel according to the first embodiment. The pixel 120 includes a SPAD 200, a quenching element 210, an inverter 220, a counter 230, and a readout switch 240. The SPAD 200 is an avalanche photodiode operated in Geiger mode to detect a single photon. As described above, the Geiger mode is an APD operation mode in which a reverse bias voltage larger than the breakdown voltage is applied to operate the APD. When the voltage Vbias larger than the breakdown voltage Vbr is applied to the SPAD 200 under the control of the voltage control unit 130 and the SPAD enters the Geiger mode, carriers generated by the incidence of a single photon cause avalanche multiplication and a large current is generated. Hereinafter, a large current generated in the Geiger mode is referred to as an avalanche current.

The quenching element 210 is a resistance element for stopping the avalanche multiplication of the SPAD 200. As the quenching element 210, an N-type or P-type MOS transistor may be used as the resistor by applying a voltage Vqnc to the gate terminal of the transistor. The anode terminal of SPAD 200 is connected to ground GND, and the cathode terminal is connected to quenching element 210. Then, a reverse bias voltage is applied by applying a voltage VIN via the quenching element 210. It should be noted that a negative voltage (for example, −10 to −30 V) may be applied to the anode terminal of the SPAD 200 instead of GND (0 V), so that a voltage of, for example, about 3 V may be applied as the voltage VIN. In other words, a reverse bias voltage higher than the breakdown voltage is applied to the SPAD 200 as a result.

When a photon enters the SPAD 200 and an avalanche current is generated, a voltage drop occurs in the quenching element 210. Due to this voltage drop, the voltage applied to the SPAD 200 becomes smaller than the breakdown voltage Vbr, gradually falls to the off-leakage current, and avalanche multiplication stops. Thereafter, when the cathode of the SPAD 200 is charged via the quenching element 210, the voltage across the SPAD 200 returns to the reverse bias voltage Vbias again. In this manner, SPAD 200 generates one voltage signal pulse at its cathode in response to incident of a single photon. At this time, the width of the voltage signal pulse varies according to the magnitude of the resistance value of the quenching element 210. In addition, the width of the voltage signal pulse generated with the incidence of photons can be changed by changing the resistance value of the quenching element 210 by the TG 140.

As described above, the inverter 220 as a buffer receives the voltage signal pulse generated by the SPAD 20 as an input, and outputs a waveform-shaped signal pulse to its output terminal.

The counter 230 receives the signal pulse output from the inverter 220 as an input, and counts its rising edge. Here, the reason why the inverter 220 is used as the buffer is that the counter counts the rising edge. When a buffer that does not invert the polarity is used, the counter 230 may be configured to count the falling edge of the signal pulse output from the buffer.

The counter 230 is a binary counter having a plurality of bits, and the number of bits can be changed by its configuration. For example, when 16 bits are set, the number of pulses for $2^{16}$ (65535 count in decimal) can be counted. In the counter 230, the TG 140 controls the start timing of the count operation and the reset operation of the count value.

The readout switch 240 is controlled by the TG 140 and is turned on when the signal changes from low to high, and the count value held in the counter 230 is written to the signal processing unit 150 via the data transfer line 160.

Figure 3:
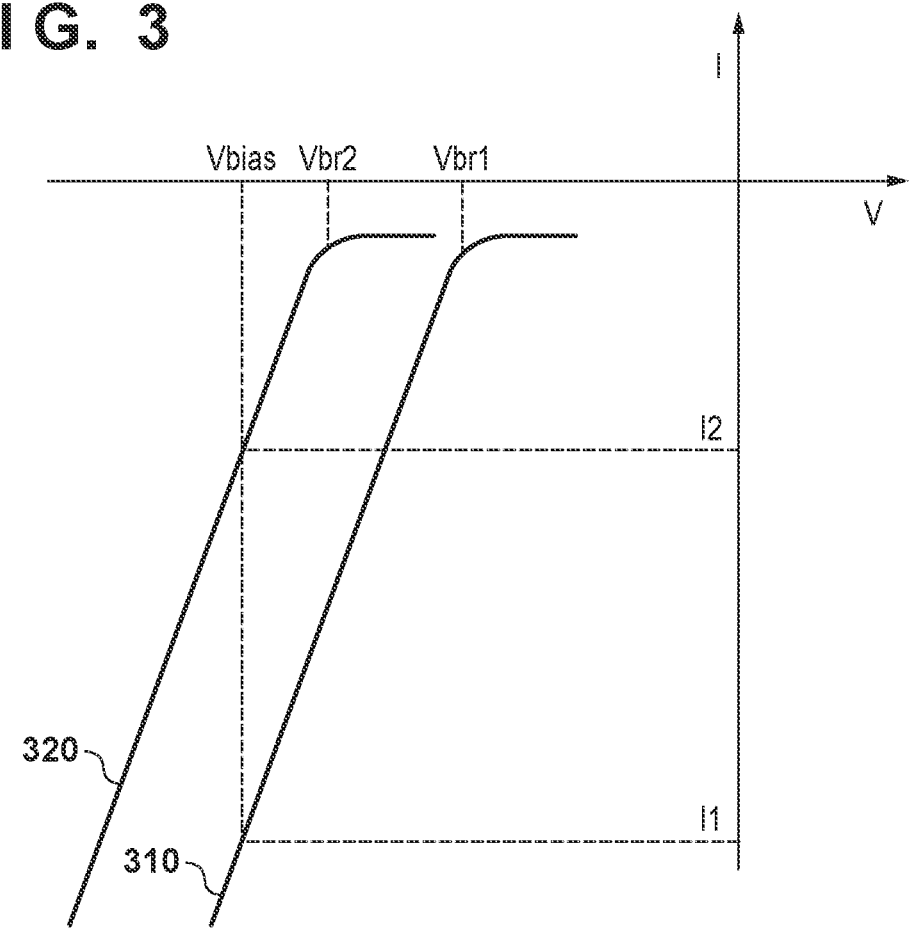
FIG. 3 is a diagram showing I-V characteristics of SPADs having different breakdown voltages.

As described above, the pixel unit 110 includes a plurality of pixels 120, and the breakdown voltages Vbr of the SPADs 200 that configures the pixels 120 vary. The variation of the breakdown voltages Vbr causes the variation of the avalanche currents. Here, the influence of the variation of the avalanche currents will be explained using the I-V characteristics of SPADs shown in FIG. 3.

Hereinafter, for the sake of explanation, of the plurality of pixels 120 constituting the pixel unit 110, the SPAD having the smallest breakdown voltage is referred to as SPAD 200a, and the SPAD having the largest breakdown voltage is referred to as SPAD 200b. The breakdown voltage of the SPAD 200a is referred to as Vbr1, and the breakdown voltage of the SPAD 200b is referred to as Vbr2. In the SPAD 200a, a small leak current flows when the reverse bias voltage is smaller than the breakdown voltage Vbr1, and when the reverse bias voltage is larger than the breakdown voltage Vbr1, the SPAD 200a operates in the Geiger mode and a large avalanche current is generated when a photon enters. Similarly, in the SPAD 200b, a small leak current flows when the reverse bias voltage is smaller than the breakdown voltage Vbr2, and when the reverse bias voltage is larger than the breakdown voltage Vbr2, the SPAD 200b operates in the Geiger mode and a large avalanche current is generated when a photon enters, In FIG. 3, reference numeral 310 denotes I-V characteristics of the SPAD 200a, and reference numeral 320 denotes I-V characteristics of the SPAD 200b.

Here, a case where a reverse bias voltage Vbias larger than the breakdown voltage Vbr2 is applied as a constant voltage so that all SPADs can detect photons will be described. The avalanche current when the reverse bias voltage Vbias is applied to the SPAD 200a is I1, and the avalanche current when the reverse bias voltage Vbias is applied to the SPAD 200b is I2. That is, the avalanche current I1 of the SPAD 200a having the smaller breakdown voltage Vbr1 is larger than the avalanche current I2 of the SPAD 200b having the larger breakdown voltage Vbr2.

Thus, the variation of the breakdown voltages causes the variation of the avalanche currents. In other words, when a large reverse bias voltage is applied as a constant voltage so that all SPADs can detect photons to a plurality of SPADs having various breakdown voltages, a large avalanche current flows in the SPADs with a small breakdown voltage. This leads to an increase in power consumption. For a SPAD having a small breakdown voltage, a reverse bias voltage Vbias having such a magnitude that causes avalanche multiplication in all the SPADs is not necessary, and more over an excessive current is generated.

In the present invention, in consideration of the above phenomena, in the image sensor 100 according to the first embodiment, the reverse bias voltage Vbias applied from the voltage control unit 130 to the SPADs 200 is periodically changed in a state for detecting photons. Hereinafter, the control of the reverse bias voltage Vbias in the first embodiment will be described in detail.

Figure 4:
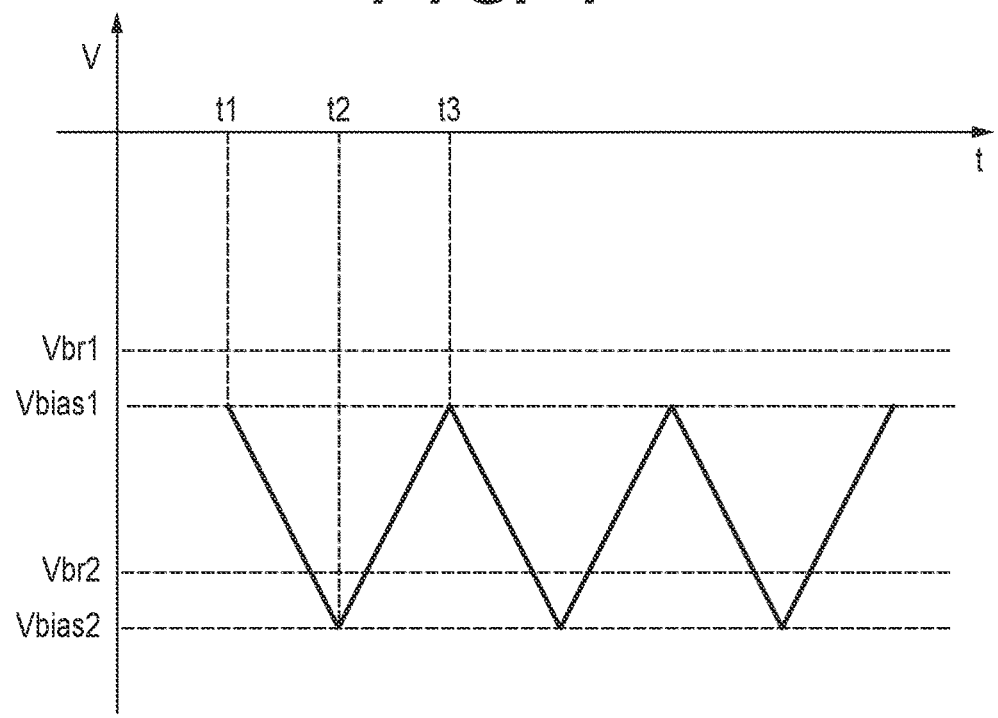
FIG. 4 is a diagram illustrating an example of a reverse bias voltage according to the first embodiment.

FIG. 4 is a diagram illustrating an example of the reverse bias voltage Vbias controlled by the voltage control unit 130 in a state for detecting photons. In FIG. 4, the horizontal axis represents time t, and the vertical axis represents reverse bias voltage Vbias in a state for detecting photons. The reverse bias voltage Vbias in the present embodiment periodically changes between a minimum reverse bias voltage Vbias1 (minimum voltage) and a maximum reverse bias voltage Vbias2 (maximum voltage).

First, at time t1 the voltage control unit 130 controls the reverse bias voltage Vbias applied to the SPADs 200 so as to become the minimum reverse bias voltage Vbias1. The minimum reverse bias voltage Vbias1 is a voltage higher than the breakdown voltage Vbr1 of the SPAD 200a having the smallest breakdown voltage among the plurality of pixels 120 constituting the pixel unit 110 of FIG. 1.

From time t1 to time t2, the reverse bias voltage Vbias is gradually increased, and at time t2, the maximum reverse bias voltage Vbias2 is reached. Note that the maximum reverse bias voltage Vbias2 is a voltage higher than the breakdown voltage Vbr2 of the SPAD 200b having the largest breakdown voltage among the plurality of pixels 120 constituting the pixel unit 110 of FIG. 1.

From time t2 to time t3, the reverse bias voltage Vbias is gradually decreased, and at time t3, the minimum reverse bias voltage Vbias is reached.

As described above, instead of always applying a constant reverse bias voltage Vbias so that all SPADs cause avalanche multiplication, in the present embodiment, the voltage control unit 130 controls the reverse bias voltage Vbias so as to periodically reciprocate between the minimum reverse bias voltage Vbias1 and the maximum reverse bias voltage Vbias2 in a state for detecting photons.

Next, the current consumption when a periodically changing reverse bias voltage as shown in FIG. 4 is applied to the SPAD 200a will be described with reference to FIG. 5.

Figure 5:
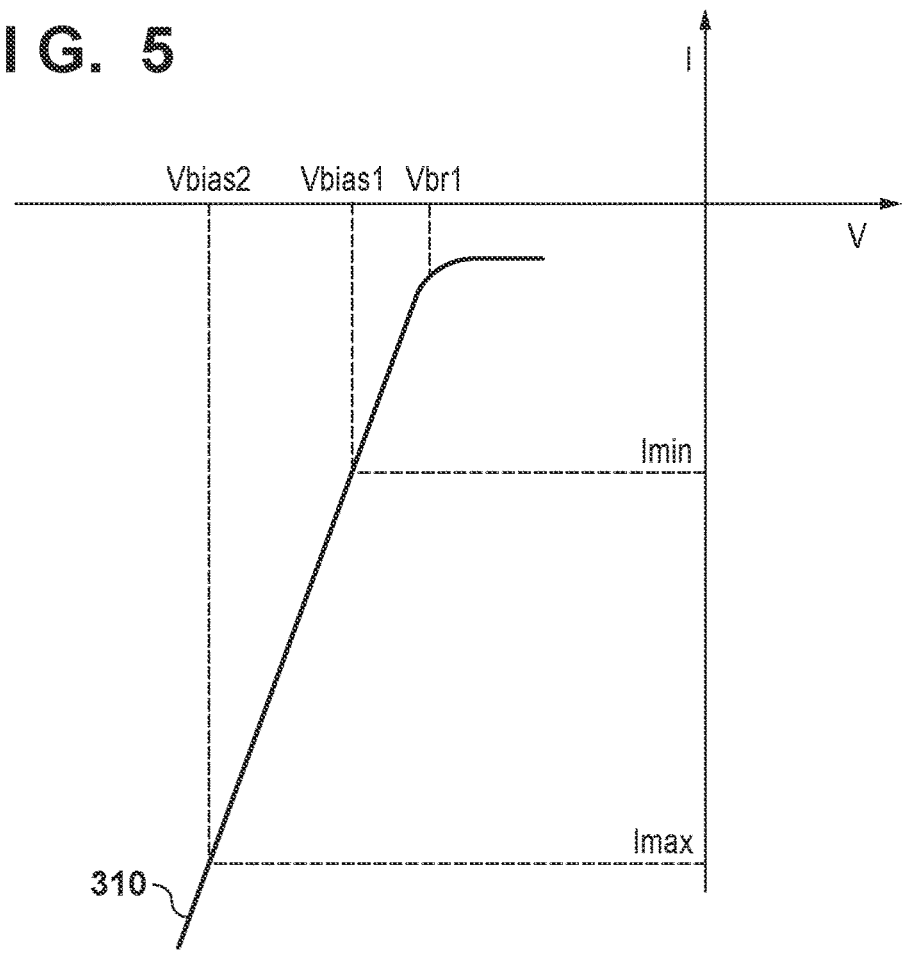
FIG. 5 is a diagram showing I-V characteristics according to the first embodiment.

FIG. 5 shows the I-V characteristics of the SPAD 200a having a small breakdown voltage Vbr1. As described above, in the present embodiment, the reverse bias voltage Vbias is controlled so as to periodically change between the minimum reverse bias voltage Vbias1 and the maximum reverse bias voltage Vbias2 under control of the voltage control unit 130. The avalanche current generated when a photon is incident at the time when the minimum reverse bias voltage Vbias1 is applied is the smallest, and is referred to as Imin, hereinafter. In addition, the avalanche current generated when a photon is incident at the time when the maximum reverse bias voltage Vbias2 is applied is the largest, and is referred to as Imax, hereinafter.

According to the timing shown in FIG. 4, when a single photon enters the SPAD 200a at time t1, the reverse bias voltage Vbias is the minimum reverse bias voltage Vbias1, and the avalanche current becomes Imin. Further, when a single photon is incident on the SPAD 200a at time t2, the reverse bias voltage Vbias is the maximum reverse bias voltage Vbias2, and the avalanche current becomes Imax.

That is, when a photon enters at a timing other than time t2 when the reverse bias voltage Vbias becomes the maximum reverse bias voltage Vbias2, the avalanche current becomes smaller than Imax, so that it is possible to suppress the current.

According to the first embodiment as described above, the average power consumption is reduced by periodically changing the reverse bias voltage Vbias applied to the SPAD 200 by the voltage control unit 130 in a state for detecting photons.

Further, in the present embodiment, since the voltage control unit 130 controls the reverse bias voltage applied to all the SPADs 200, the circuit configuration of the pixel 120 can be reduced comparing to a mechanism that changes the reverse bias voltage for each pixel 120.

Figure 6A:
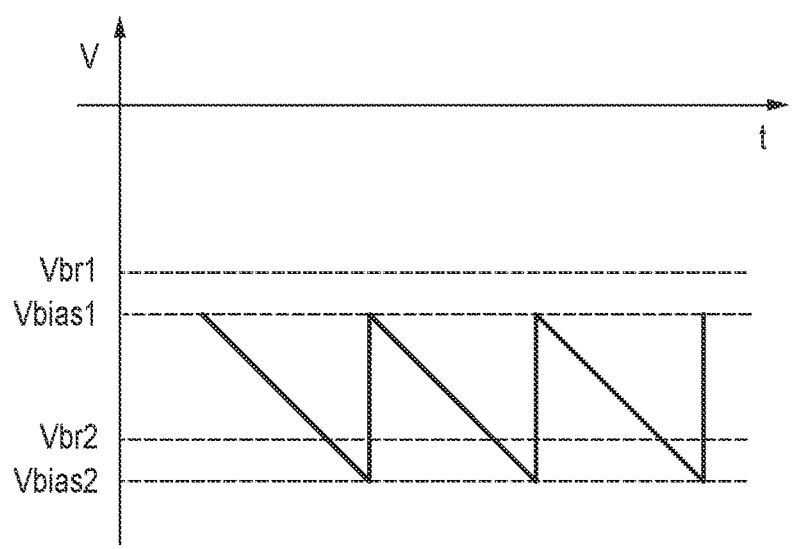
FIGS. 6A to 6C are diagrams showing other examples of reverse bias voltages according to the first embodiment.
Figure 6B:
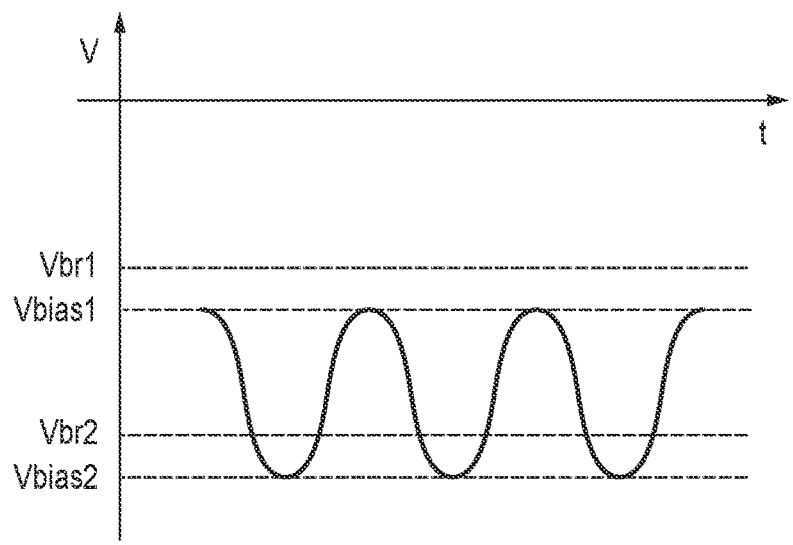
Figure 6C:
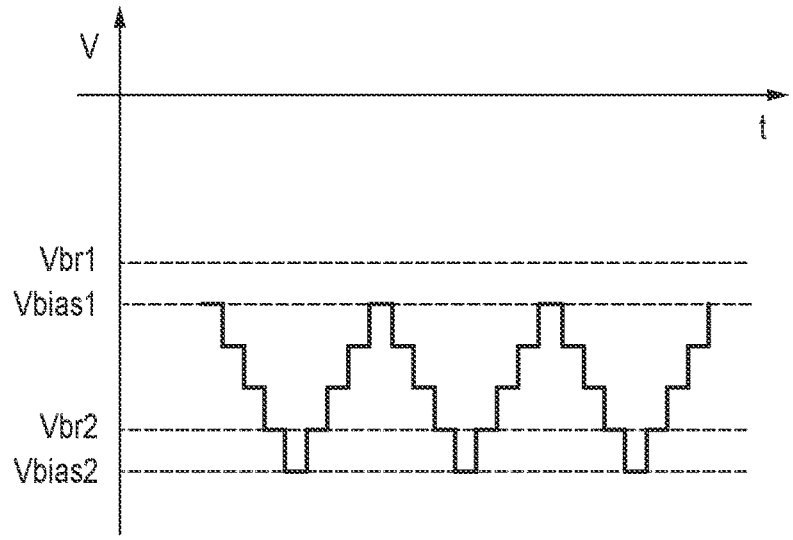

In the present embodiment, an example is described in which the reverse bias voltage Vbias applied to the SPAD controlled by the voltage control unit 130 is a triangular wave, however, the present invention is not limited to this. Any voltage control that periodically changes the reverse bias voltage Vbias between the minimum reverse bias voltage Vbias1 and the maximum reverse bias voltage Vbias2 may be performed. For example, the same effect can be obtained even if the reverse bias voltage Vbias is a sawtooth wave as shown in FIG. 6A, a sine wave as shown in FIG. 6B, or a wave that changes stepwise as shown in FIG. 6C.

Further, for example, it is conceivable that the minimum reverse bias voltage Vbias1 is larger than 10V and the maximum reverse bias voltage Vbias2 is smaller than 30V.

Since the breakdown voltage changes depending on the temperature, a temperature measurement unit (not shown) may be provided, and the minimum reverse bias voltage Vbias1 and the maximum reverse bias voltage Vbias2 may be adjusted according to the measured temperature with respect to a predetermined reference value.

Second Embodiment

Next, a method for controlling the image sensor 100 according to the second embodiment of the present invention will be described with reference to FIG. 7. Note that the configuration of the image sensor 100 in the second embodiment is the same as that described in the first embodiment, and a description thereof will be omitted. In the following description, points that are different from the first embodiment will be described.

Figure 7:
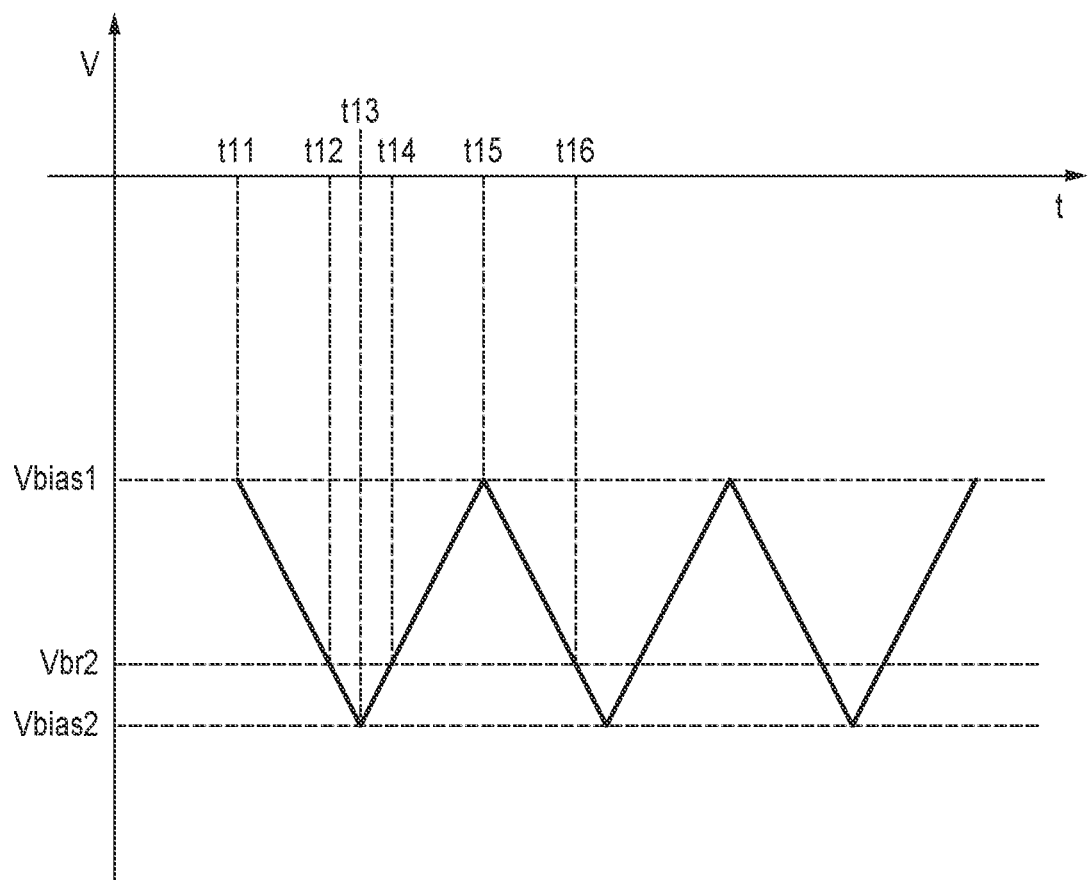
FIG. 7 is a diagram for explaining a cycle of a reverse bias voltage according to a second embodiment.

FIG. 7 is a diagram illustrating the reverse bias voltage Vbias controlled by the voltage control unit 130 in a state for detecting photons, as in FIG. 4. The reverse bias voltage Vbias periodically changes between the minimum reverse bias voltage Vbias1 and the maximum reverse bias voltage. Here, a case where a periodically changing reverse bias voltage is applied to the SPAD 200b having a large breakdown voltage will be described.

First, at time t11, the voltage control unit 130 controls the reverse bias voltage Vbias applied to the SPADs 200 so as to become the minimum reverse bias voltage Vbias1.

From time t11 to time t13, the reverse bias voltage Vbias is gradually increased, and at time t3, and the reverse bias voltage Vbias becomes the maximum reverse bias voltage Vbias2.

From time t13 to time t15, the reverse bias voltage Vbias is gradually decreased, and at time t5, and the reverse bias voltage Vbias becomes the minimum reverse bias voltage Vbias1.

In a state for detecting photons, the voltage control unit 130 controls so that the change of the reverse bias voltage from time t1 to time t5 is periodically repeated.

In a case where the reverse bias voltage Vbias that changes as described above is applied to the SPAD 200b, the reverse bias voltage Vbias is larger than the breakdown voltage Vbr2 of the SPAD 200b from time t12 to time t14 in one cycle, so photons can be detected in that period.

On the other hand, the reverse bias voltage Vbias is smaller than the breakdown voltage Vbr2 of the SPAD 200b in the periods from time t11 to time t12 and from t14 to t15, so photons cannot be detected in those periods.

A problem called dead time is known in a light receiving element using a general SPAD. In a case where photons are continuously incident on the SPAD 200, especially, in a case where a new photon is subsequently incident before the signal pulse generated at the output node of the inverter 220 returns from High to Low, the signal pulse remains High, and the second photon cannot be counted. As described above, a period since one photon is incident and counted until the next incident photon can be counted is called a dead time.

Due to this dead time, when the illuminance is high, that is, when an amount of received light per predetermined time is large, a plurality of signal pulses may be overlapped, so that the counted value of photons may become lower than the actual number of incident photons.

It is possible to suppress the influence of a state where the SPAD 200b cannot detect photons by making the cycle of the reverse bias voltage Vbias shorter than the dead time.

For the SPAD 200b having a large breakdown voltage, if the cycle of the reverse bias voltage is long, the counted value of photons may be lower than the actual number of incident photons. On the other hand, as described above, SPAD has a potential problem called dead time in which continuously incident photons cannot be counted. If the time (the continuous time from time 14 to t16) during which the reverse bias voltage Vbias is smaller than the breakdown voltage Vbr2 is shorter than the dead time, it is possible to suppress the influence of the decrease in the count value. Therefore, by setting the cycle of the reverse bias voltage Vbias shorter than the dead time, it is possible to suppress the influence of a state in which the SPAD 200b cannot detect photons.

Since the breakdown voltage changes depending on the temperature, a temperature measurement unit (not shown) may be provided, and the cycle of the reverse bias voltage may be adjusted according to the measured temperature with respect to a predetermined reference value.

In addition, the time interval between successively incident photons changes depending on the illuminance or the aperture of a diaphragm.

Accordingly, an illuminance measurement unit (not shown) may be provided, and the cycle of the reverse bias voltage may be adjusted according to the measured illuminance or the aperture of a diaphragm with respect to a predetermined reference value.

Third Embodiment

Figure 8:
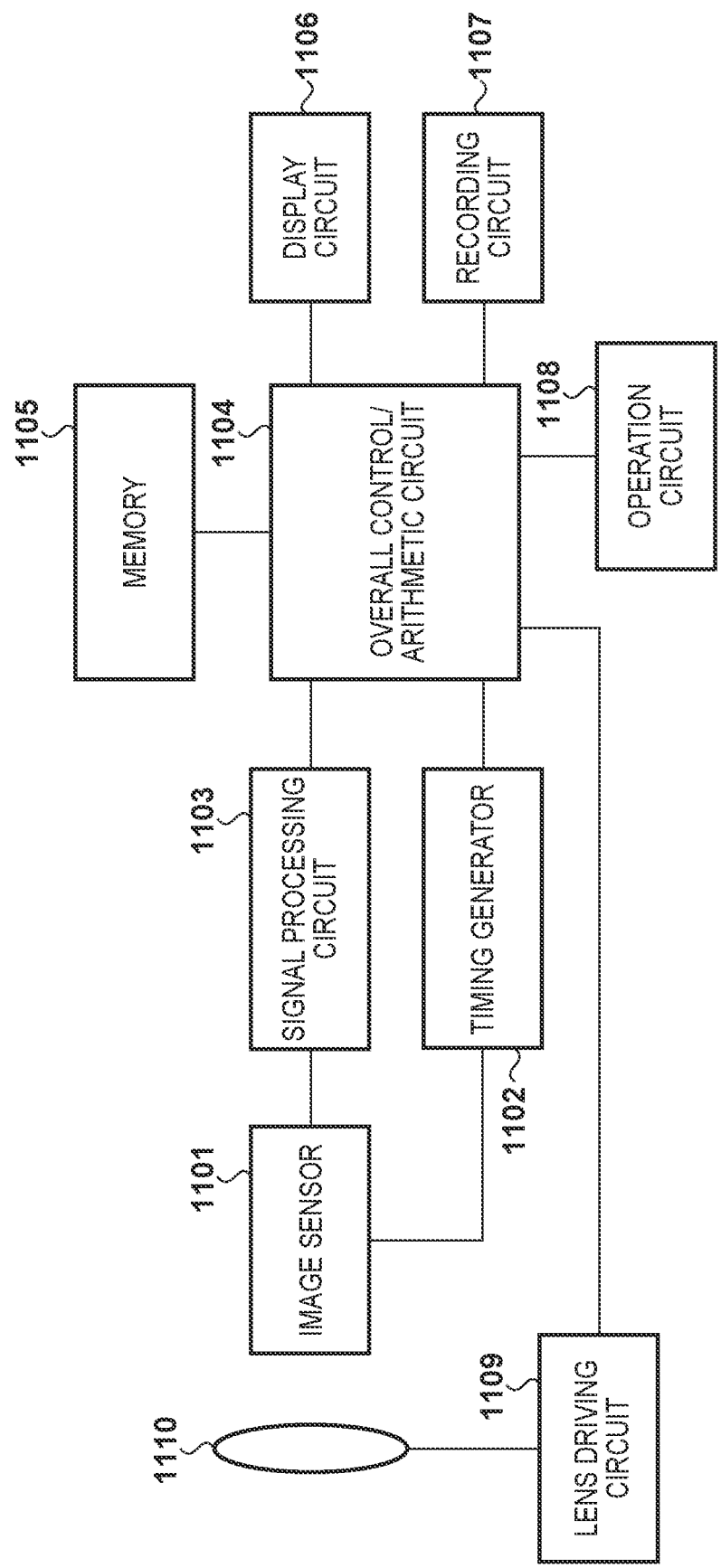
FIG. 8 is a block diagram illustrating an overall configuration of an image capturing apparatus according to a third embodiment.

Next, a third embodiment of the present invention will be described. FIG. 8 is a block diagram illustrating a schematic configuration of an image capturing apparatus. The image sensor 100 described in the first and second embodiments is used as an image sensor 1101.

A lens driving circuit 1109 performs zoom control, focus control, and diaphragm control for an imaging lens unit 1110, and the imaging lens unit 1110 forms an optical image of a subject on the image sensor 1101. The image of the subject formed on the image sensor 1101 is converted into an electrical image signal, and then the image signal is output from the image sensor 1101. A signal processing circuit 1103 performs various types of corrections on the image signal output from the image sensor 1101, and compresses data.

A timing generator 1102 outputs a timing signal that drives the image sensor 1101. An overall control/arithmetic circuit 1104 performs various types of arithmetic operations and controls overall operations of the image capturing apparatus including the operations of the image sensor 1101. Image data output from the signal processing circuit 1103 is temporarily stored in a memory 1105. A display circuit 1106 displays various types of information and a captured image. A recording circuit 1107 is a circuit for performing reading and writing on a detachable storage medium such as a semiconductor memory for recording or reading out image data. An operation circuit 1108 includes a group of input devices such as switches, buttons, and a touch panel, and receives a user instruction for the image capturing apparatus.

Other Embodiment

The present invention may be applied to a system including a plurality of devices or to an apparatus including a single device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-079562, filed on Apr. 18, 2019 which is hereby incorporated by reference herein in its entirety.

What is claimed is:

1. An image sensor comprising:
a plurality of pixels each having an avalanche photodiode; and
a voltage supply that supplies to the avalanche photodiodes of the plurality of pixels a reverse bias voltage that periodically and reciprocally changes between a first voltage and a second voltage,
wherein the first voltage is larger than a smallest breakdown voltage among breakdown voltages of the avalanche photodiodes of the plurality of pixels and the second voltage is larger than a largest breakdown voltage among the breakdown voltages of the avalanche photodiodes of the plurality of pixels, and
wherein the first and second voltages are set based on the respective breakdown voltage.

2. The image sensor according to claim 1, wherein the voltage supply adjusts the minimum voltage of the reverse bias voltage according to temperature measured by a thermometer that measures temperature.

3. The image sensor according to claim 1, wherein the voltage supply adjusts the maximum voltage of the reverse bias voltage according to temperature measured by a thermometer that measures temperature.

4. The image sensor according to claim 1, wherein the minimum voltage of the reverse bias voltage is larger than 10 volts.

5. The image sensor according to claim 1, wherein the maximum voltage of the reverse bias voltage is smaller than 30 volts.

6. The image sensor according to claim 1, wherein the voltage supply changes the reverse bias voltage at a cycle shorter than dead time of the avalanche photodiodes.

7. The image sensor according to claim 6, wherein the voltage supply adjusts the cycle according to temperature measured by a thermometer that measures temperature.

8. The image sensor according to claim 6, wherein the voltage supply adjusts the cycle according to illuminance measured by a photometer that measures illuminance.

9. The image sensor according to claim 6, wherein the voltage supply adjusts the cycle according to an aperture of a diaphragm that limits an amount of light to be incident on the image sensor.

10. An image capturing apparatus comprising:
an image sensor having:
a plurality of pixels each having an avalanche photodiode, and
a voltage supply that supplies to the avalanche photodiodes of the plurality of pixels a reverse bias voltage that periodically and reciprocally changes between a first voltage and a second voltage;
a processor and
a memory including instructions stored thereon, which when executed by the processor cause the image capturing apparatus to:
process a signal output from the image sensor,
wherein the first voltage is larger than a smallest breakdown voltage among breakdown voltages of the avalanche photodiodes of the plurality of pixels and the second voltage is larger than a largest breakdown voltage among the breakdown voltages of the avalanche photodiodes of the plurality of pixels, and
wherein the first and second voltages are set based on the respective breakdown voltage.

11. A control method of an image sensor having a plurality of pixels each having an avalanche photodiode, comprising:
supplying to the avalanche photodiodes of the plurality of pixels a reverse bias voltage that periodically and reciprocally changes between a first voltage and a second voltage,
wherein the first voltage is larger than a smallest breakdown voltage among breakdown voltages of the avalanche photodiodes of the plurality of pixels and the second voltage is larger than a largest breakdown voltage among the breakdown voltages of the avalanche photodiodes of the plurality of pixels, and
wherein the first and second voltages are being set based on the respective breakdown voltage.

12. A non-transitory computer-readable storage medium, the storage medium storing a program that is executable by the computer, wherein the program includes program code for causing the computer to perform a control method of an image sensor having a plurality of pixels each having an avalanche photodiode, comprising:
controlling a voltage supply to supply to the avalanche photodiodes of the plurality of pixels a reverse bias voltage that periodically and reciprocally changes between a first voltage and a second voltage,
wherein the first voltage is larger than a smallest breakdown voltage among breakdown voltages of the avalanche photodiodes of the plurality of pixels and the second voltage is larger than a largest breakdown voltage among the breakdown voltages of the avalanche photodiodes of the plurality of pixels, and
wherein the first and second voltages are set based on the respective breakdown voltage.

* * * * *